May 6, 1958  M. J. RUDERIAN  2,833,436
COMBINATION THERMOS BOTTLE ASSEMBLAGE
Filed Nov. 5, 1956  2 Sheets-Sheet 1

INVENTOR.

Max J. Ruderian

May 6, 1958   M. J. RUDERIAN   2,833,436
COMBINATION THERMOS BOTTLE ASSEMBLAGE
Filed Nov. 5, 1956   2 Sheets-Sheet 2

INVENTOR.
Max J. Ruderian

United States Patent Office 2,833,436
Patented May 6, 1958

2,833,436

COMBINATION THERMOS BOTTLE ASSEMBLAGE

Max J. Ruderian, Santa Monica, Calif.

Application November 5, 1956, Serial No. 620,378

2 Claims. (Cl. 215—6)

This invention relates to carrying food containers, and more particularly to a novel structural assemblage of a combination of Thermos bottles and jars for the purpose of carrying different types of food in one compact unit. Its main object is to provide an arrangement of novel coupling structure between associated members of an assemblage of food containers, for example, Thermos bottles and jars, that may be adapted to readily combine said containers in various modes, for example, a Thermos bottle with two similar cups, one serving as a drinking cup and as a cover for same, and one serving as a jar for storing solid food, or further in variation, two independent Thermos bottles for carrying two different liquid foods in one compact unit. The principle object of the present invention is accordingly to provide a versatile coupling arrangement which renders independent food containers to be used either independently or in combination, as associated parts, and with particular novelty of providing simple functional manipulation for its assemblage.

Figure 1:
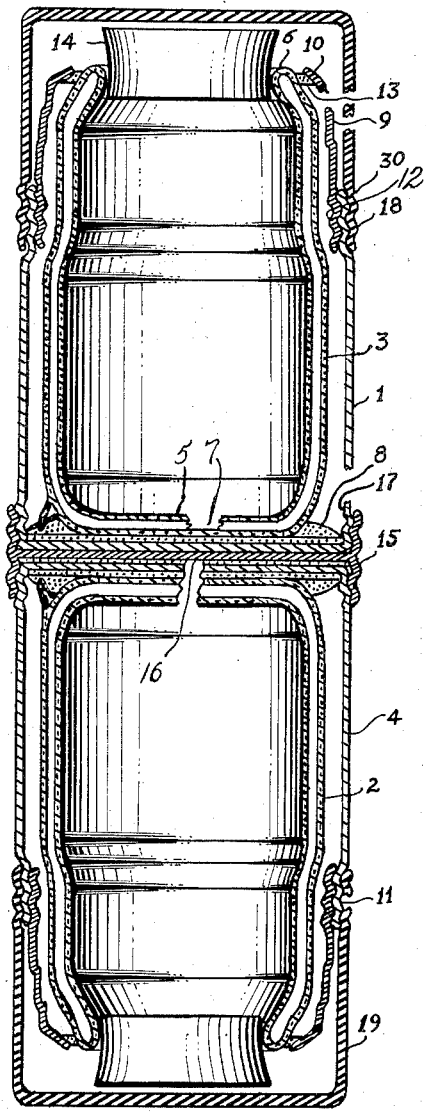
Figure 2:
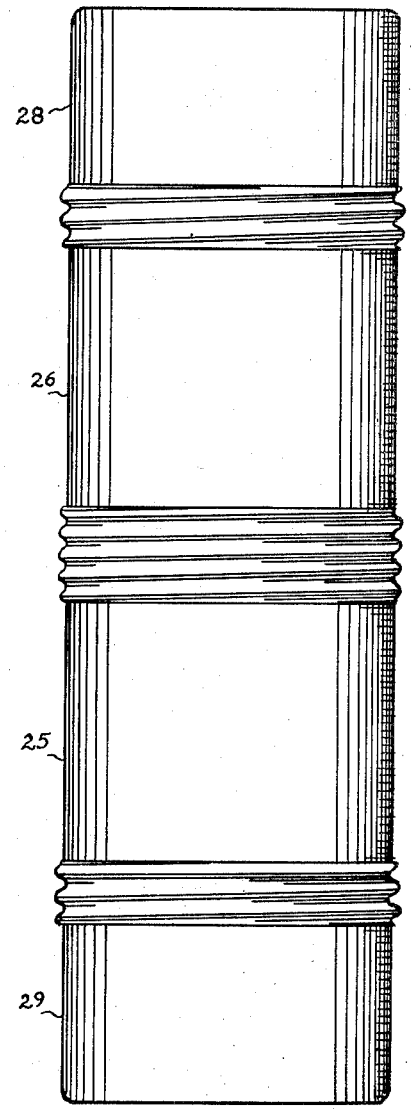
Figure 3:
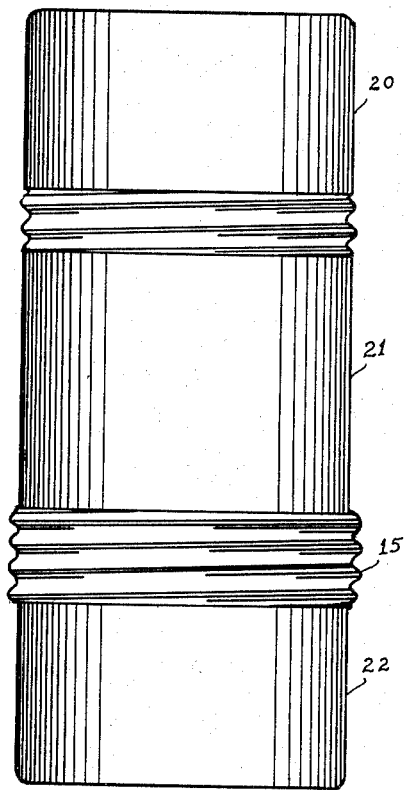
Figure 4:
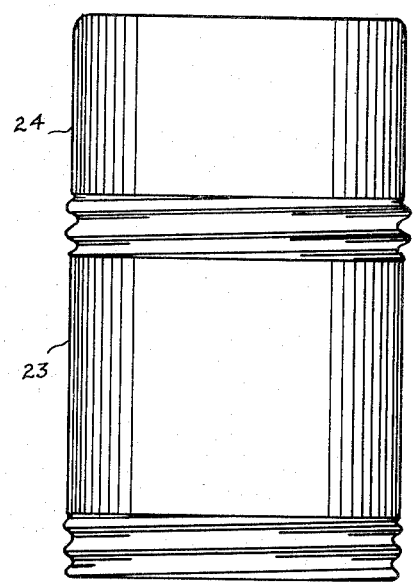

For further understanding of the objects and features of this invention, reference is now made to the following description of certain illustrative embodiments showing the preferred mode of carrying it into useful application, and the claims appended hereto will then define the invention not only as embodied in the illustrative examples, but also in a scope to embrace various other forms which it is capable of assuming in practice. The invention is illustrated by the accompanying drawings, wherein, Fig. 1 is a cross sectional view of the combined assemblage of two Thermos bottles in accordance with the invention; Fig. 2 is a perspective view of Fig. 1; Fig. 3 is a perspective view of an assemblage of one Thermos bottle and a jar in a single unit in accordance with the invention; and Fig. 4 is a perspective view of the Thermos bottle used in a singular unit.

Referring now to the illustrated parts of an assemblage of independent food carrying containers, as embodied in the present invention, Fig. 1 shows two similar vacuum vessels 1 and 2, housed in protective outer casings or shells 3 and 4. The upper and lower portions of said housings and the vessels 1, 2 are assumed to be identical for practical purposes, but not necessarily if so desired, and accordingly, reference numerals will hereinafter in most part of this specification be made to only the upper section of the drawing. The vacuum vessel just referred to, has been commercially used in the name of Thermos bottle, and accordingly complete detail of its function need not necessarily be given herein. For reference numerals, however, a bottle of this type comprises two separated receptacles 3 and 5 connected at their necks 6, the latter of which forms a mouth and completes an enclosure of vacuum chamber 7 between their walls. Such a vacuum vessel is usually made of silvered thin glass, and requires padding against breakage. Various forms have been utilized for such padding, for example, a cushioned soft spring has been mounted at the closed end of the vessel as a means of preventing against vibration or sudden shocks. Although my present invention is not primarily concerned with constructional details of such shock proof mechanism, nevertheless, the illustration of Fig. 1 is shown with soft shock absorbing material 8, for example, foam rubber, as one of various means of protecting the base end of the vacuum vessel 1.

The type of Thermos vessel, as described above, is usually housed in an outer casing or shell which consists of two parts, for example, as illustrated in the drawing of Fig. 1, a lower portion of the shell 1, and a detachable upper portion 9. This upper portion is usually utilized as a mechanical means for securing the vacuum vessel 3 within the confines of the contemplated outer shell, by a depressed mouth 10 which is pressed centrally over the mouth of the vessel 3 through screw threaded rims 11 and 12 of said lower and upper portions of the outer shell, respectively. To avoid hard surface contact between the parts 6 and 10, an annular ring 13 of shock absorbing material, such as rubber, or of other effectively equivalent material thereof, is interposed between said two surfaces. To complete the unitary housing, a closure cork 14, and a closure cup, the latter of which is also intended for drinking purposes, are included.

It is obvious to this point that the illustrated parts, and description thereof, have been of conventional nature. The novel structure of the present invention, however, is the provision of a simple mechanical coupling means which in combination of associated parts is capable of forming an assemblage of independent vacuum vessels, of the class described above, in a compact singular unit. This coupling means is denoted by the numeral 15, and is constructed in the form of a threaded tubing with an interiorly mounted disk 16, the latter of which renders said tubing into two oppositely ended socket-like sections. The closed end of the outer casing 1 is threaded as denoted by the numeral 17. The pitch diameter of the exteriorly threaded section 17 is arranged to conform fittingly the pitch diameter of the interiorly threaded section of 15, so that the casing 1 can be securely screw-threaded into said socket-like section of tubing 15. This threaded engagement, of course, also relates in like manner to the casing 4, since as stated in the foregoing, the upper and lower sections of the combined assemblage are of similar form; although for esthetic purposes their structural designs may differ considerably.

To facilitate different combinations of the assemblage of the arrangement shown in Fig. 1, it is contemplated herein that various detachable parts be provided with like threaded sections, so that said parts may be coupled one with another in a desired combination. For example, the novelty of this invention is furthered by arranging the cup 14 with both interiorly and exteriorly threaded lip 18, so pitched in diameter that the cup may either be screwed onto the threaded rim 11 of said outer casing, or screwed into the threaded socket-like section of coupling means 15. To establish these desired results, the threaded section 11 is depressed and made smaller in pitch diameter than the pitch diameter of the threaded section 17 at the base of outer shell 1. This permits the exteriorly threaded section 18 of cup 14 to have the same pitch diameter as the interiorly threaded section of the coupler 15, while by the same token, the interiorly threaded section of said cup to have the same pitch diameter as the exteriorly threaded section 11 of said outer shell, or casing. It is thus obvious that such a mechanical arrangement is capable of providing different combinations of food compartment assemblage. As an example, the lower housing 4 may be removed from the coupler 15, and the cup 19 inserted in its place, such as illustrated in three dimensional form in Fig. 3, comprising a cup 20; the casing 21 of a Thermos vessel; and another cup 22 serving as a jar. In this case, the Thermos vessel housed in outer shell 21 would, for example, be utilized to store food in liquid form, such as milk, coffee, or the like; the cup 20 would, for example, be utilized for drinking of same; and the cup 22, would, for example, be utilized as a jar for storing solid, such as salads, Jello, or the like as may be desired. Of course, when it is desired to carry a liquid of one kind, the outer shell of the Thermos bottle may be disengaged from the coupler 15, and utilized as a single unit, such as illustrated in Fig. 4, comprising an outer shell 23 and a closure cup 24. Then again, when two different types of liquids are to be carried in a single unit, then the illustration of Fig. 2 shows the general outer appearance of same, comprising outer shells 25, 26 of two independent Thermos bottles; a mechanical coupler 27 of same; and two closure cups 28, 29.

The illustrated parts in the accompanying drawings may vary in physical form for either esthetic purposes or practical manufacturing techniques. For example, the threaded portion of coupler 15 may either comprise both interiorly and exteriorly threaded section, as drawn, or the outer surface may be smoothed out. Either one or both of the threadedly terminating ends 30 of cup 14 may be formed with annular ledge to serve as resting seat to either the lip end of rim 11, or the lip end of coupler 15. The screw-threaded rims 11 and 12 may be reversed in position, for example, the physical size of rims 11 and 12 may be changed so that the rim 12 may be screwed onto the rim 11, instead as shown, screwed into the rim 11. In this case, the cup would be screwed onto rim 12, instead as shown, screwed onto rim 11. Also, the drawing of Fig. 1 is shown with a soft gasket 31, for example of rubber material, which may serve as a spill proof cushion against the lip of a cup, when in this case, a cup is inserted in the socket-like section of coupler 15, instead of the outer shell of a Thermos vessel.

Having described the preferred embodiment of the present invention, I wish it to be understood that the illustrations included herein constitute only exemplary forms of the invention to enable the skilled in this particular art to obtain a clear understanding of the novel features as distinguished from the prior art, since as indicated in the foregoing, various modifications and substitutions of parts are obviously possible without departing from the true spirit and scope of the alleged invention disclosed herein.

What I claim is:

1. Coupling arrangements for versatile-assemblage of Thermos bottles and jars, the combined structure of which comprises in combination an interiorly threaded tubular ring divided into first and second oppositely ended socket-like sections by an internally mounted central disk; first and second Thermos bottles, of the class described, having closure means at their mouths, and first and second protective outer shells, respectively, each of said shells having at its closed end an exteriorly threaded section to conform fittingly any of the interiorly threaded surfaces of said first and second socket-like sections, and each of said shells having at its mouthed end a similar threaded section of smaller pitch diameter than the threaded sections aforementioned; and first and second closure cups, each cup having at its lip interiorly and exteriorly threaded sections, the interiorly threaded section being fittingly in conformity with the exteriorly threaded section of any of said mouthed-threaded sections, and the exteriorly threaded section being fittingly in conformity with said socket-like sections, whereby providing like-fitting parts for forming the versatile assemblage aforesaid.

2. The coupling arrangement as set forth in claim 1, wherein the inwardly terminating ends of the threaded lips of said first and second cups include annular seats to rest upon the open threaded ends of said first and second socket-like sections.

References Cited in the file of this patent

UNITED STATES PATENTS

| | | |
|---|---|---|
| 1,549,269 | Koree et al. | Aug. 11, 1925 |
| 2,099,174 | Payson | Nov. 16, 1937 |
| 2,462,461 | Bird | Feb. 22, 1949 |
| 2,687,231 | Somers | Aug. 24, 1954 |